(12) United States Patent
Sauer et al.

(10) Patent No.: US 12,490,677 B2
(45) Date of Patent: Dec. 9, 2025

(54) SYSTEM FOR AUTOMATICALLY CONTROLLING A TRANSFER PROCESS FROM A HARVESTING MACHINE TO A TRANSPORT VEHICLE IN CONSIDERATION OF HARVESTED MATERIAL PROPERTIES

(71) Applicant: Deere & Company, Moline, IL (US)

(72) Inventors: Patrick Sauer, Rheinland Palatinate (DE); Akshay Khot, Rheinland Palatinate (DE)

(73) Assignee: DEERE & COMPANY, Moline, IL (US)

( * ) Notice: Subject to any disclaimer, the term of this patent is extended or adjusted under 35 U.S.C. 154(b) by 183 days.

(21) Appl. No.: 18/543,245

(22) Filed: Dec. 18, 2023

(65) Prior Publication Data
US 2024/0224875 A1    Jul. 11, 2024

(30) Foreign Application Priority Data

Jan. 11, 2023    (DE) .......................... 102023100539.1

(51) Int. Cl.
*A01D 90/10*    (2006.01)

(52) U.S. Cl.
CPC ................................... *A01D 90/10* (2013.01)

(58) Field of Classification Search
CPC ........ A01D 90/10; A01D 43/07; A01D 43/08; A01D 41/1217; A01D 41/127; A01D 43/073; A01D 45/00; G06T 7/70; G06T 2207/30188; G06T 2207/30252; G06V 20/56; G01S 17/89
See application file for complete search history.

(56) References Cited

U.S. PATENT DOCUMENTS

| | | | | |
|---|---|---|---|---|
| 5,749,783 | A * | 5/1998 | Pollklas | G05D 3/12 56/10.2 D |
| 2003/0066277 | A1* | 4/2003 | Behnke | A01D 41/127 56/10.2 R |
| 2006/0094487 | A1* | 5/2006 | Huster | A01D 43/087 460/114 |
| 2007/0037621 | A1* | 2/2007 | Isfort | A01D 43/086 460/114 |
| 2008/0245042 | A1* | 10/2008 | Brunnert | A01D 43/087 460/114 |

(Continued)

FOREIGN PATENT DOCUMENTS

| | | |
|---|---|---|
| DE | 102018004219 A1 | 11/2019 |
| EP | 1219158 A1 | 7/2002 |

(Continued)

*Primary Examiner* — Jelani A Smith
*Assistant Examiner* — Alyssa Rorie

(57) ABSTRACT

A system for automatically controlling a transfer process, in which harvested material is transferred from a harvesting machine into a cargo container of a transport vehicle, using an electronic control unit, which is configured to generate, on the basis of signals supplied thereto, a positioning signal for one or more actuators to influence the location of the impact point of the harvested material in the cargo container in terms of carrying out a predetermined loading strategy for filling the cargo container, and to a harvesting machine equipped therewith.

20 Claims, 5 Drawing Sheets

(56) References Cited

U.S. PATENT DOCUMENTS

| | | | | |
|---|---|---|---|---|
| 2009/0044505 | A1* | 2/2009 | Huster | A01D 43/087 |
| | | | | 56/10.2 R |
| 2012/0263560 | A1* | 10/2012 | Diekhans | A01D 43/087 |
| | | | | 414/294 |
| 2012/0302299 | A1* | 11/2012 | Behnke | A01B 69/008 |
| | | | | 701/50 |
| 2015/0025754 | A1* | 1/2015 | Krause | A01D 43/073 |
| | | | | 701/50 |
| 2017/0000024 | A1* | 1/2017 | Farley | A01D 41/127 |
| 2023/0065442 | A1* | 3/2023 | Spiekermann | A01D 41/1271 |
| 2024/0074356 | A1* | 3/2024 | Fugunt | A01F 15/0825 |

FOREIGN PATENT DOCUMENTS

| | | |
|---|---|---|
| EP | 1344445 A1 | 9/2003 |
| EP | 1454520 A1 | 9/2004 |
| EP | 1671530 A1 | 6/2006 |
| EP | 1977640 A1 | 10/2008 |
| EP | 2510775 A1 | 10/2012 |
| EP | 2827213 A2 | 1/2015 |
| EP | 2893797 A2 | 7/2015 |
| EP | 3062597 A1 | 9/2016 |
| EP | 3150052 A1 | 4/2017 |
| EP | 3949714 A1 | 2/2022 |
| EP | 3970471 A1 | 3/2022 |
| EP | 4046474 A1 | 8/2022 |
| WO | WO 2012110543 A1 | 8/2012 |
| WO | WO 2015063078 A1 | 5/2015 |

\* cited by examiner

SYSTEM FOR AUTOMATICALLY CONTROLLING A TRANSFER PROCESS FROM A HARVESTING MACHINE TO A TRANSPORT VEHICLE IN CONSIDERATION OF HARVESTED MATERIAL PROPERTIES

FIELD OF THE DISCLOSURE

The present disclosure relates to a system for automatically controlling a transfer process, in which harvested material is transferred from a harvesting machine into a cargo container of a transport vehicle.

BACKGROUND OF THE DISCLOSURE

When harvesting agricultural products on a field using a harvesting machine, it is routine practice that a transport vehicle travels along adjacent to the harvesting machine and is loaded with harvested plant material. A cargo container of the transport vehicle, which is typically a tractor with trailer or a truck, is loaded during the journey by a discharge unit of the harvesting machine with the harvested product, for example, in a forage harvester by a discharge spout and in a combine harvester by a discharge pipe. The discharge unit is generally fastened rotatably around a vertical axis on the harvesting machine and is pivotable between a shutdown position, in which it is oriented approximately parallel to the longitudinal axis of the harvesting machine, and a working position, in which it extends transversely to the travel direction of the harvesting machine.

With discharge units adjustable in operation, as are typically used on forage harvesters, there is the possibility of varying the angle of the discharge unit around the vertical axis. In addition, the height of the delivery-side end of the discharge unit is variable, as is the position of a discharge flap, which defines the angle at which the harvested product is delivered. The position of the discharge unit is manually controlled by the driver of the harvesting machine in the simplest case, for which input units in the cab are available to him, which activate actuators used for adjusting the discharge unit. The driver of the harvesting machine has to take care in this case that the entire cargo container of the transport vehicle is sufficiently filled, which is carried out by successively orienting the discharge unit toward different points on the cargo container. Alternatively or additionally, the driver of the transport vehicle changes its position in relation to the harvesting machine in the forward direction and possibly in the lateral direction in order to fill different areas of the cargo container in succession. This procedure is also typical in combine harvesters, which generally have no discharge unit or a discharge unit adjustable in operation only around the vertical axis (see EP 2 893 797 A2).

A large number of proposals have been made in the prior art to automate the transfer process, whether by automatic controlling of the orientation of the transfer unit in relation to the harvesting machine and thus the throwing direction of the delivered harvested material and/or by controlling of the position of the cargo container of the transport vehicle in relation to the harvesting machine. It is therefore detected by means of a sensor and/or calculated by means of a model at which point the harvested material lands on the cargo container and the orientation of the transfer unit and/or relative position of the cargo container is controlled (regulated or controlled) accordingly, wherein the adjustment of the transfer unit generally enables a faster reaction than a readjustment of the position. A specific loading strategy can be worked out in this case in order to fill different points of the cargo container gradually and it has been proposed that external conditions be taken into consideration in the supervision of the transfer process.

These conditions can relate, for example, to the current or future movement status of the harvesting machine and the transport vehicle. EP 3 150 052 A1 proposes for this purpose that a possible rotation of the harvesting machine around the vertical axis, i.e., when traveling around curves, also be detected in the activation of the transfer unit and be taken into consideration in the activation of the transfer unit in order to ensure that the harvested material lands at the intended point on the cargo container even when traveling around curves, while EP 3 062 597 A1, EP 3 970 471 A1, and EP 4 046 474 A1 propose using a known future path of the harvesting machine to be traveled for this purpose. WO 2012/110543 A1 describes a control of the relative position of a transport vehicle in relation to a harvesting machine on the basis of the detected positions, in which, inter alia, the relative velocity of the two in relation to one another is taken into consideration to determine the supervision signal. The external conditions are incorporated in the supervision process in the documents cited in this paragraph in the form of a correction of the relative position to be expected for the future.

Furthermore, the conditions can relate to properties of the harvested material. Thus, EP 1 977 640 A1 proposes selecting the dimensions of an edge zone of the cargo container to which harvested material is not applied in dependence on the type, dryness, and chop length of the harvested material, in order to avoid losses. Moreover, the size of the edge zone can depend on the velocity of both vehicles and the relative velocity. EP 3 949 714 A1 describes model-based filling of the cargo container based, inter alia, on properties of the harvested material (type, density, and moisture), with a correction option by the operator and a self-learning function for the model based thereon. The external conditions (dependent, inter alia, on the properties of the harvested material) are used here to define the boundaries of the loadable area of the cargo container or to ascertain the expected point at which the harvested material reaches the cargo container.

SUMMARY OF THE DISCLOSURE

In practice, it has been established that different harvested materials also have different flow properties during the transfer. Thus, chopped corn consists of relatively heavy particles having a small surface area which cannot be easily deflected by external influences such as wind, and the resulting jet only fans out slightly after leaving the discharge spout due to the (low) air resistance of the particles, since the ratio of mass to surface area is relatively high. On the other hand, chopped grass consists of relatively light particles having a large surface area, which can be deflected more by wind and the jet fans out after leaving the discharge spout, due to the (high) air resistance of the particles at the given, lower ratio of mass to surface area to a greater extent than with corn. This has the result that problems result more when harvesting grass in the transfer with respect to deviations of the impact point from a desired impact point than with corn, and therefore transfer losses can also occur more easily. Corn is less critical in relation thereto. If one adapts the regulation to corn, there is the risk that harvested material will be lost (lands adjacent to the cargo container) in the harvesting of grass due to slow reactions, while an adaptation for grass would result in undesirably frequent and strong positioning commands to the actuators in the harvesting of corn. A further problem is that with grass, more dynamic maneuvers are usually carried out than in corn, since the fields are usually more curvy in grass farming and the swath is possibly laid in a very curvy manner. The fields are usually more homogeneous with corn and are usually less curvy during the harvesting.

The object underlying the disclosure is considered that of providing a system for automatically controlling a transfer process from a harvesting machine to a transport vehicle which does not have the mentioned disadvantages or has them to a reduced extent. This object is achieved according to the disclosure by the teachings of the claims.

A system for automatically controlling a transfer process, in which harvested material is transferred from a harvesting machine into a cargo container of a transport vehicle, is equipped with an electronic control unit which is configured to generate, on the basis of signals supplied thereto, a positioning signal for one or more actuators to influence the location of the impact point of the harvested material in the cargo container in terms of carrying out a predetermined loading strategy for filling the cargo container. The control unit is configured to control a step width of the loading strategy for successive loading of the cargo container at different impact points and/or the dimension of the positioning signal with a given deviation between an impact point of the harvested material predetermined by the loading strategy and an impact point of the harvested material ascertained on the basis of the signals as a function of information supplied to the control unit with respect to at least one property of the harvested material.

In other words, it is proposed that the step width of the loading strategy, i.e., the distances of the points at which the harvested material is loaded in succession onto the cargo container, be controlled automatically as a function of information supplied to the control unit with respect to at least one property of the harvested material. This information can be output in a way known per se by the operator via an interface and supplied to the control unit and/or can be ascertained on the basis of sensorially detected operating conditions of the harvesting machine or sensorially detected properties of the harvested material, and/or the control unit ascertains it on the basis of properties of the harvesting machine, for example, the type of the harvesting header (a corn header is used for the corn harvest, a pickup is used for the grass harvest, and a cutting mechanism is used for whole plant silage) or the presence or non-presence of a grain processor in the harvested material flow, which are ascertainable via suitable means (e.g., plug code or camera for detecting the type of the harvesting header or the harvested material on the field in front of the harvesting machine). The step width of the loading strategy is thus adapted to the harvested material, which reduces or avoids the problems mentioned at the outset.

Alternatively or additionally, the control unit can make the reaction to a possible deviation between actual position and target position of the impact point of the harvested material on the cargo container dependent on the information mentioned in the preceding paragraph. With certain harvested material properties, a more aggressive reaction of the positioning signal at the actuator thus takes place for a given deviation than with other harvested material properties. The curvier shape of the swath in the grass harvest can thus be taken into consideration by a "sharper" readjustment of the actuator than in a corn harvest.

The actuator can influence one or more of the following parameters: Relative position between harvesting machine and cargo container in forward direction and/or lateral direction, angle of a discharge unit of the harvesting machine around a vertical axis, angle of a discharge unit of the harvesting machine around a horizontal axis, and/or angle of an end-side discharge flap of a discharge unit of the harvesting machine in relation to the discharge unit.

The information supplied to the control unit with respect to the properties of the harvest can relate to the type of the harvested material (ascertainable in the above-described manner) and/or its moisture (determinable using a suitable sensor, for example, a near-infrared spectrometer) and/or a particle size (on the basis of the chop length, which can be determined in a way known per se on the basis of the speed—in particular transmitted via a machine bus—of the cutterhead and the number of cutters and/or is ascertainable by means of a model and/or a correlation for the relationship between length and width of the particles and/or is determinable by means of a camera and image processing, cf. EP 1 671 530 A1) of the harvested material and/or the amount of the harvested material transferred per unit of time. The throughput through the transfer unit also influences the flight behavior of the harvested material and can therefore reasonably be taken into consideration in the determination of the step width of the loading strategy and/or the reaction to a given deviation of the impact point of the harvested material.

The control unit can include an inner control loop for activating the actuator, which is configured to generate at least a part of the positioning signal emitted to the actuator proportionally to a deviation between the impact point of the harvested material predetermined by the loading strategy and the impact point of the harvested material ascertained on the basis of the signals. The control unit can be configured here to specify the associated proportionality factor of the inner control loop in dependence on the information with respect to the property of the harvested material.

Furthermore, the control unit can be configured to limit the positioning signal (and thus the velocity at which the actuator moves) to a maximum value dependent on the information with respect to the property of the harvested material and/or to use a hysteresis dependent on the property of the harvested material, i.e., to generate a positioning signal only upon deviations between an impact point of the harvested material predetermined by the loading strategy and an impact point of the harvested material ascertained on the basis of the signals that exceed a threshold, the level of which is dependent on the information.

The control unit can comprise an outer control loop for ascertaining the deviation between the impact point of the harvested material predetermined by the loading strategy and the impact point of the harvested material ascertained on the basis of the signals, the output signal of which is used jointly with a sensorially detected value for the current position of the actuator as an input signal for the inner control loop. The control unit can be configured to determine the impact point on the basis of sensorially detected values and a model, which uses the values, for the flight behavior of the harvested material.

In particular, the control unit is configured to output a greater reaction of the positioning signal to a possible deviation between target value and actual value of the impact point and/or smaller step widths in the loading strategy in the case of a harvested material having a small ratio of mass to surface area than in the case of a harvested material having a larger ratio of mass to surface area.

The control unit can be configured to take into consideration a relative movement between the harvesting machine and the transport vehicle in the generation of the positioning signal.

Other features and aspects will become apparent by consideration of the detailed description and accompanying drawings.

Before any embodiments are explained in detail, it is to be understood that the disclosure is not limited in its application to the details of construction and the system of components set forth in the following description or illustrated in the following drawings. The disclosure is capable of other embodiments and of being practiced or of being carried out in various ways. Further embodiments of the disclosure may include any combination of features from one or more dependent claims, and such features may be incorporated, collectively or separately, into any independent claim.

DETAILED DESCRIPTION

Figure 1:
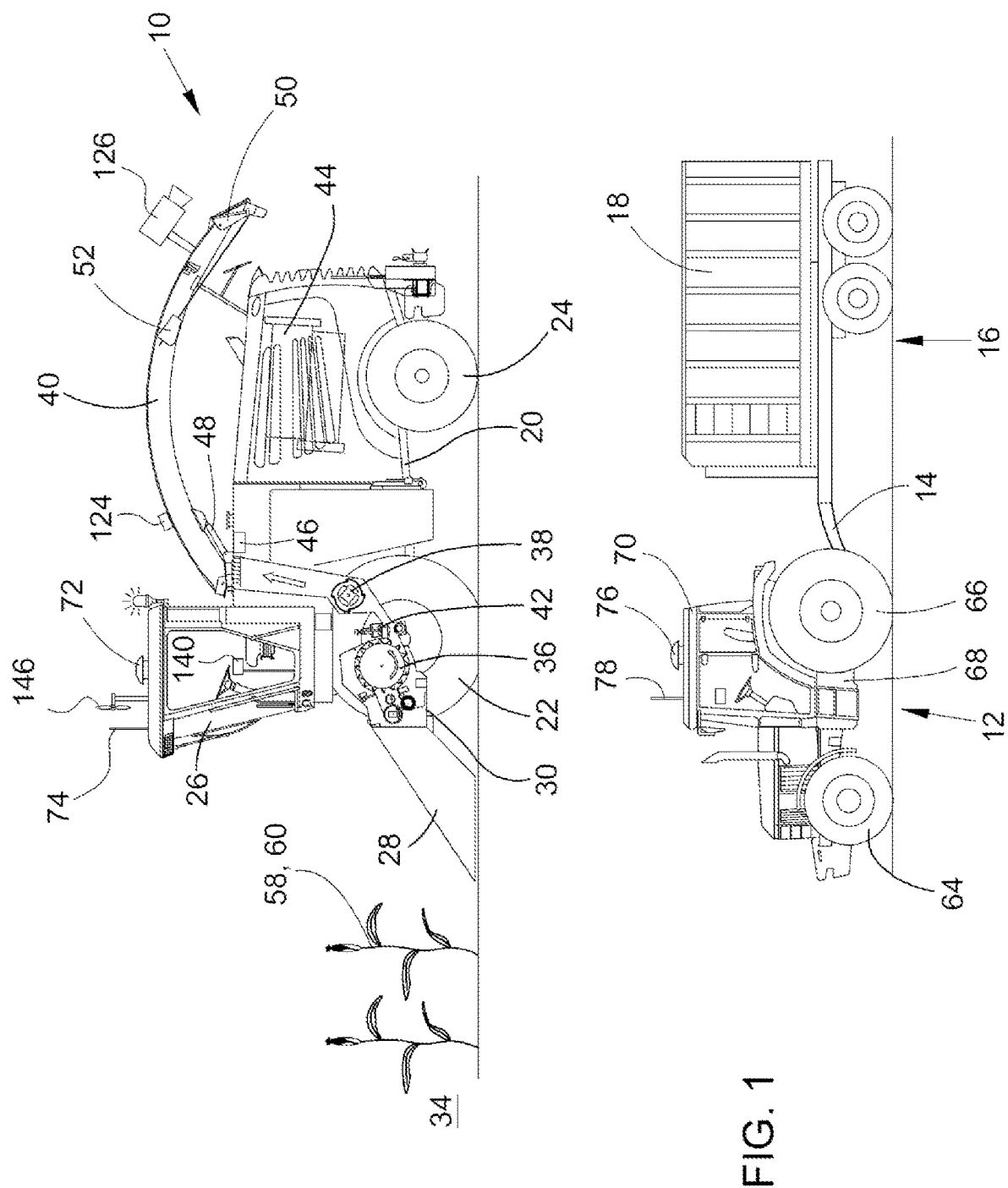
FIG. 1 is a side view of a self-propelled harvesting machine and a transport vehicle according to one embodiment.

A combination of two agricultural machines shown in FIG. 1 comprises a harvesting machine 10 in the manner of a self-propelled forage harvester and a transport vehicle 12 in the manner of a self-propelled tractor, which pulls a trailer 16, which comprises a cargo container 18, by means of a drawbar 14.

The harvesting machine 10 is built on a frame 20, which is supported by front driven wheels 22 and steerable rear wheels 24. The harvesting machine 10 is operated from a driver cab 26, from which a harvesting header 28 in the form of a corn cutting header is visible, which is fastened at an intake channel 30 on the front side of the harvesting machine 10. By means of the harvesting header 28, harvested material received from a field 34 is supplied, via an intake conveyor having feed rollers and arranged in the intake channel 30, to a cutterhead 36, which chops it into small pieces and delivers it to a fan 38. A secondary crushing device 42 having two grain processor rollers extends between the cutterhead 36 and the fan 38. The mentioned drivable assemblies of the harvesting machine 10 and the harvesting header 28 are driven by means of an internal combustion engine 44.

The material discharged from the fan 38 leaves the harvesting machine 10 to the cargo container 18 driving alongside via a discharge unit, which is composed of a stationary discharge shaft adjoining the fan 38 directly at the top and a discharge spout 40, which is rotatable by means of a first, power-operated actuator 46 around an approximately vertical axis and is adjustable in the inclination by means of a second, power-operated actuator 48, the discharge direction of which is changeable by a discharge flap 50, the inclination of which is adjustable by means of a third, power-operated actuator 52. The discharge spout 40 and the discharge flap 50 are shown in their transport position in FIG. 1, into which they are brought, for example, when the harvesting machine 10 drives on a road. During the harvesting process, the discharge spout 40 is raised by means of the actuator 48 and, by means of the actuator 46, either rotated to a side of the harvesting machine 10 if sufficient space is present after the harvesting laterally to the harvesting machine 10 for the transport vehicle 12 on a harvested area 54 of the field, or the discharge spout 40 remains in the position oriented to the rear according to FIG. 1 if initially a lane is cut into the field, but is raised by the actuator 48.

The transport vehicle 12 and the trailer 16 are conventional designs. The transport vehicle 12 comprises front steerable wheels 64 and rear driven wheels 66, which are supported on a frame 68, which carries a driver cab 70.

Figure 2:
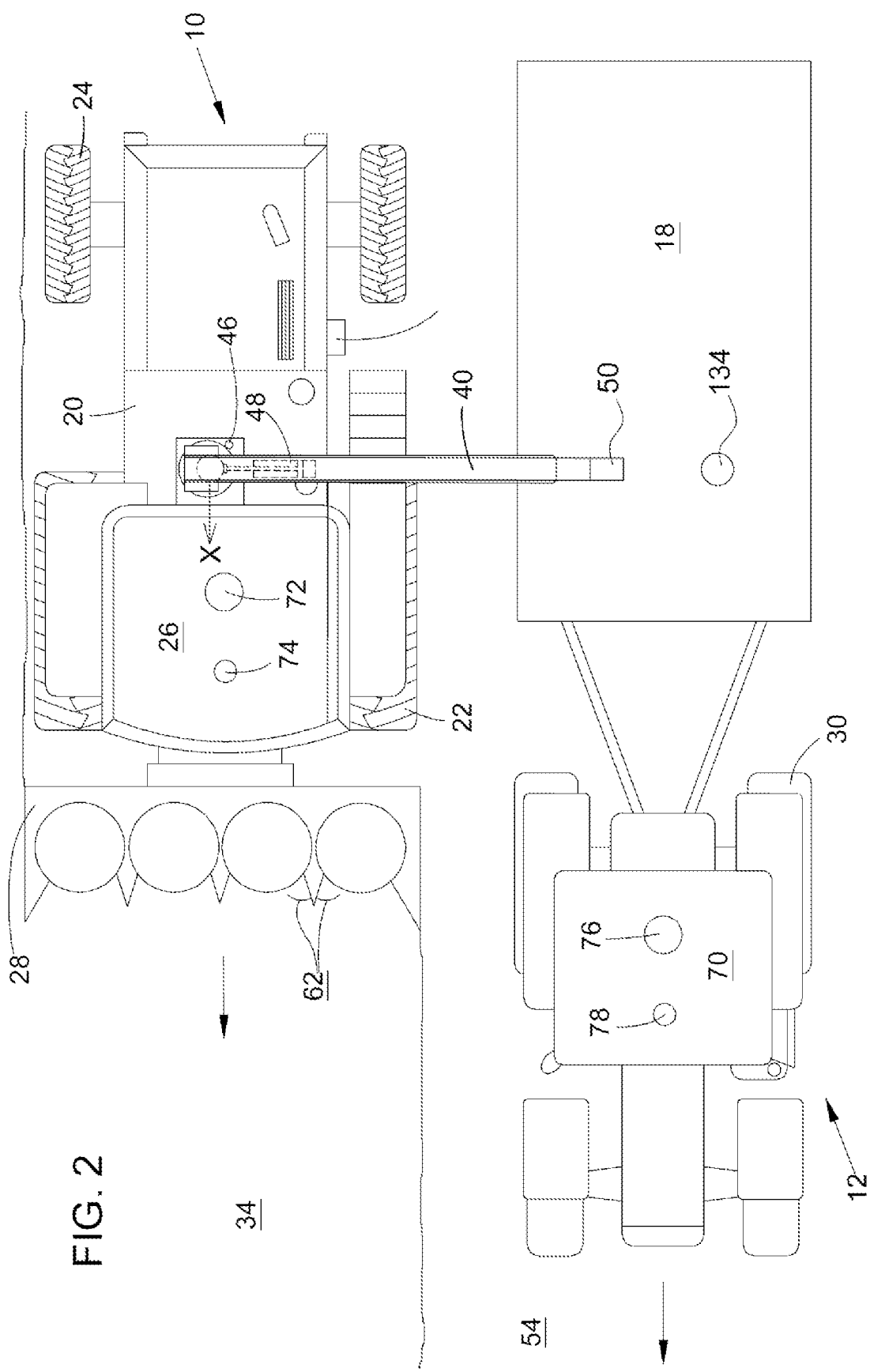
FIG. 2 is a schematic top view of the harvesting machine and the transport vehicle, which jointly carry out a harvesting and transfer process on a field, wherein the harvested material is transferred to the cargo container of the transport vehicle.
Figure 3:
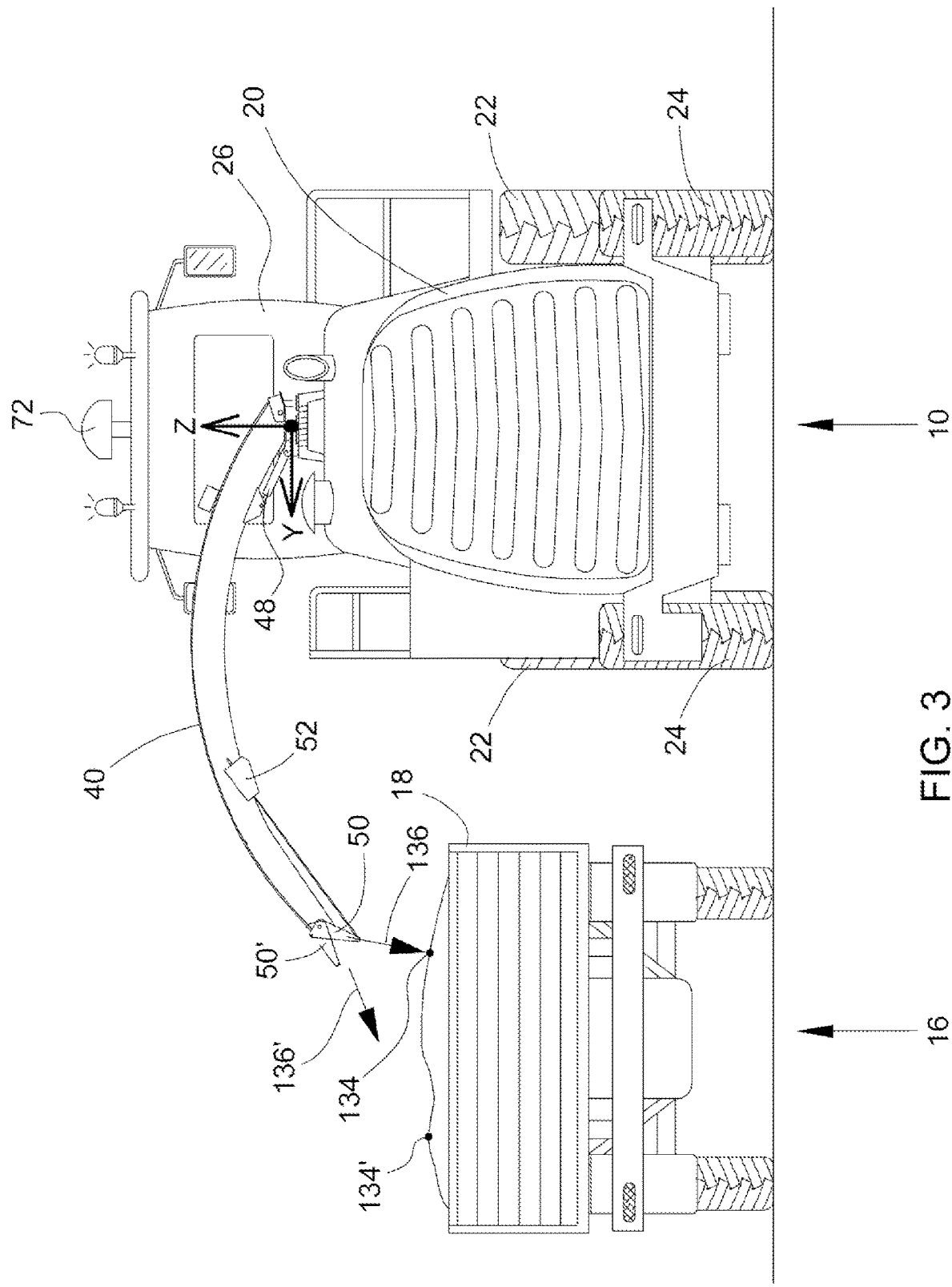
FIG. 3 is a rear view of the harvesting machine and the transport vehicle from FIG. 2.

The harvesting machine 10 and the transport vehicle 12 are shown in a top view in FIG. 2. It is apparent that the harvesting machine 10 travels along a harvested material edge, which represents a boundary between the harvested area 54 of the field 34 and the still standing stock 60 of the field 34 occupied with corn plants 58, and which harvests the plants 58. The transport vehicle 12 travels on the harvested area 54 of the field 34 parallel to the harvesting machine 10 along a path on which the plants cut by the harvesting machine 10 reach the first cargo container 18 through the discharge unit. The transport vehicle 12 typically travels parallel adjacent to the harvesting machine 10, as shown in FIG. 2. During the harvesting, however, the transport vehicle 12 can also travel behind the harvesting machine 10, since a harvested part 54 of the field 34 is not yet present, on which the transport vehicle 12 could travel without damaging the plants standing there. A rear view of the situation shown in FIG. 2 is shown in FIG. 3.

The harvesting machine 10 is steered by a driver seated in the driver cab 18 or by an automatically working steering device, which is known per se, in particular on the basis of sensing bands 62 for detecting the harvested material rows. The transport vehicle 12 is also equipped with a steering unit, described in more detail hereinafter, to facilitate or automate the parallel driving in relation to the harvesting machine 10. The harvesting machine 10 could also be any other self-propelled harvesting machine, such as a combine harvester or beet harvester, in which the transfer unit is generally not adjustable in operation.

The harvesting machine 10 is equipped with a first position determination unit 72 for receiving signals of a satellite-based navigation system (GNSS), which is located on the roof of the cab 26. A first radio antenna 74 is also positioned there. The transport vehicle 12 is equipped with a second position determination unit 76, which is located on the roof of the cab 70. A second radio antenna 78 is also positioned there. In addition, the harvesting machine 10 is equipped with a sensor system 126, which is attached at the outer end of the discharge spout 40 and is used to detect the contours of the cargo container 18 and/or its fill level with harvested material. The sensor system 126 can be an ultrasonic or laser distance meter two-dimensionally scanning its field of view directed toward the cargo container 18, or it is a three-dimensionally operating (PMD) camera, or two cameras, which generate a stereo image, or a two-dimensionally operating camera which is combined with a distance meter scanning the field of view, or a single monocular camera. The output signal of the sensor system 126 is processed by a processing circuit 130 (cf. FIG. 4).

Figure 4:
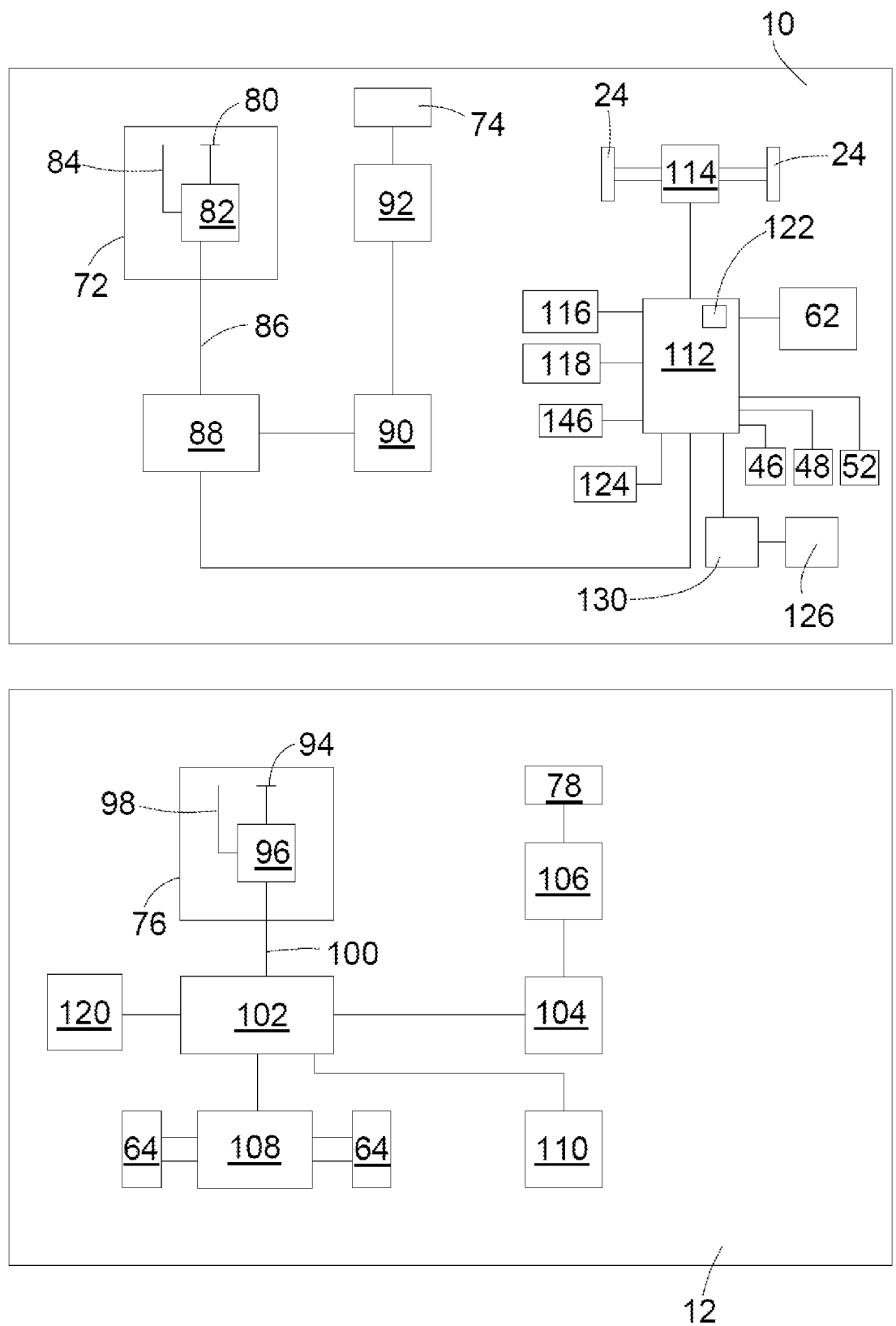
FIG. 4 is a schematic illustration of the control unit for controlling the transfer of the harvested material.

Reference will now be made to FIG. 4, in which the individual components of the system for controlling the transfer of the harvested material from the harvesting machine 10 to the cargo container 18, including the sensor system 126 and the position determination units 72, 76, and the steering unit of the transport vehicle 12 and the harvesting machine 10 are schematically shown. The first position determination unit 72, which comprises an antenna 80 and an evaluation circuit 82 connected to the antenna 80, is located on board the harvesting machine 10. The antenna 80 receives signals from satellites of a position determination system, such as GPS, Galileo, or Glonass, which are supplied to the evaluation circuit 82. The evaluation circuit 82 determines the current position of the antenna 80 on the basis of the signals of the satellites. The evaluation circuit 82 is furthermore connected to a correction data receiving antenna 84, which receives radio waves emitted by reference stations at known locations. Correction data for improving the accuracy of the position determination unit 72 are generated on the basis of the radio waves by the evaluation circuit 82.

The evaluation circuit 82 transmits its position data to a computer unit 88 through a bus line 86. The computer unit 88 is connected via an interface 90 to a receiving and transmitting unit 92, which is in turn connected to the radio antenna 74. The receiving and transmitting unit 92 receives and generates radio waves, which are received or emitted by the antenna 74.

Similarly, a second position determination unit 76, which comprises an antenna 94 and an evaluation circuit 96 connected to the antenna 94, is located on board the transport vehicle 12. The antenna 94 receives signals from satellites of the same position determination system as the antenna 80, which are supplied to the evaluation circuit 96. The evaluation circuit 96 determines the current position of the antenna 94 on the basis of the signals of the satellites. The evaluation circuit 96 is furthermore connected to a correction data receiving antenna 98, which receives radio waves emitted by reference stations at known locations. Correction data for improving the accuracy of the position determination unit 76 are generated on the basis of the radio waves by the evaluation circuit 96.

The evaluation circuit 96 passes on its position data to a computer unit 102 through a bus line 100. The computer unit 102 is connected via an interface 104 to a receiving and transmitting unit 106, which is in turn connected to the radio antenna 78. The receiving and transmitting unit 106 receives and generates radio waves, which are received or emitted by the antenna 78. Data can be transmitted from the computer unit 88 to the computer unit 102 and vice versa by the receiving and transmitting units 90, 106 and the radio antennas 74, 78. The connection between the radio antennas 74, 78 can be direct, for example, in an authorized radio range such as CB radio or the like, or can be provided via one or more relay stations, for example, if the receiving and transmitting units 90, 106 and the radio antennas 74, 78 operate according to the GSM standard or another suitable standard for mobile telephones.

The computer unit 102 is connected to a steering unit 108, which controls the steering angle of the front, steerable wheels 64. In addition, the computer unit 102 transmits velocity signals to a velocity specification unit 110, which controls the velocity of the transport vehicle 12 via a variation of the engine speed of the transport vehicle 12 and/or the transmission ratio. In addition, the computer unit 102 is connected to a permanent memory 120.

The computer unit 88 is connected to a control unit 112 on board the harvesting machine 10. The control unit 112 is connected to a steering unit 114, which controls the steering angle of the rear steerable wheels 24. In addition, the control unit 112 transmits velocity signals to a velocity specification unit 116, which controls the velocity of the transport vehicle 12 via a variation of the transmission ratio. The control unit 112 is furthermore connected to a throughput sensor 118, which detects the distance between the feed rollers in the intake channel, to a sensor for detecting the position of sensing bands 62 attached to a distributor tip of the harvesting header 28, a permanent memory 122, the processing circuit 130, and to the actuators 46, 48, and 52.

In harvesting operation, the harvesting machine 10 is steered along the harvested material edge in that the control unit 112 gives steering signals to the steering unit 114, which are based on the signals from the position determination unit 72 and a map stored in the memory 122, which define a path plan for the coming harvesting process, or on signals from the sensing bands 62 or a combination of both signals. Alternatively or additionally, the harvested material edge is detected using a two-dimensional or three-dimensional camera and an image processing system or a laser or ultrasonic sensor or scanner and is used to generate the steering signal for the steering unit 114. The path of the harvesting machine 10 does not necessarily have to run absolutely straight, but can also comprise curves depending on the shape of the field. In addition, turning processes are provided at the field end.

The advance velocity of the harvesting machine 10 can be specified by its driver, or the control unit 112 uses the throughput signals of the throughput sensor 118 in order to activate the velocity specification unit 116 such that a desired throughput is achieved by the harvesting machine 10.

In addition, the transport vehicle 12 is guided parallel to the harvesting machine 10, in that the control unit 112 transmits data with respect to the position to be maintained by the transport vehicle 10 to the computer unit 102 via the computer unit 88 and the radio antennas 74, 78. The computer unit 102 then activates the steering unit 108 and the velocity specification unit 110 accordingly in that it compares the position detected using the position determination unit 76 to the position to be maintained and gives steering signals to the steering unit 108 depending on the result of the comparison. This comparison and the generation of the steering signal for the steering unit 108 could also be carried out by the computer unit 88 and/or the control unit 112 on board the harvesting machine 10, wherein the position data are transmitted from the position determination unit 76 of the transport vehicle via the radio antennas 74, 78 to the harvesting machine 10, while the steering signals are transmitted in the reverse direction back to the transport vehicle 12. The transport vehicle 12 also follows the harvesting machine 10 when traveling on curves and when turning at the field end. The discharge unit is oriented by appropriate activation of the actuators 46, 48, 52 by the control unit 112 automatically onto the cargo container 18, for which purpose the control unit 112 uses signals from the processing circuit 130 and/or from the computer unit 88.

In this case, the load status of the cargo container 18 is detected, for which purpose the signals of the processing circuit 130 are used, which can be supplemented or replaced by highly integrated signals of throughput sensor 118 and/or signals from a content sensor 124, designed as a near-infrared spectrometer, for detecting contents of the harvested material. As long as the cargo container 18 is not completely filled, it is checked whether a desired target fill level is reached at the point of the cargo container 18 to which harvested material is presently applied. If this is the case, the discharge unit is oriented on another point of the cargo container 18. A specific loading strategy is used here, which fills the cargo container 18 from front to back or vice versa, wherein in each case harvested material is applied to one point 134 until a specific fill level is reached, and then harvested material is loaded again at a point displaced by one step width to the front or rear. The harvested material can be applied here to the middle of the cargo container 18 with respect to the lateral direction, or to a different, laterally offset point (cf. reference sign 134' in FIG. 3, for which purpose the discharge direction 136, 136' is changeable by means of the discharge flap 50 in that the discharge flap can be moved into the position 50'), or it can be applied to both in succession. The signals of the processing unit 130 are accordingly used in step 212 to activate the actuators 46, 48, 52. Additionally or alternatively, the position of the transport vehicle 12 is varied in relation to the harvesting machine 10 in the forward direction and/or in the lateral direction in that the control unit 112 transmits corresponding data with respect to the position to be maintained by the transport vehicle 10 to the computer unit 102 via the computer unit 88 and the radio antennas 74, 78. The path of the harvested material between the delivery end of the discharge unit and the cargo container 18 can thus be kept relatively short, which has the advantages that in the event of wind, few harvested material losses result and the harvested material is pre-compacted on the cargo container 18.

It is to be noted that in a simplified embodiment, the driver of the harvesting machine 10 steers it and specifies its velocity, while the drivers of the transport vehicles 12 steer them and specify their velocities. The control unit 112 then only controls the actuators 46, 48, and 52.

Figure 5:
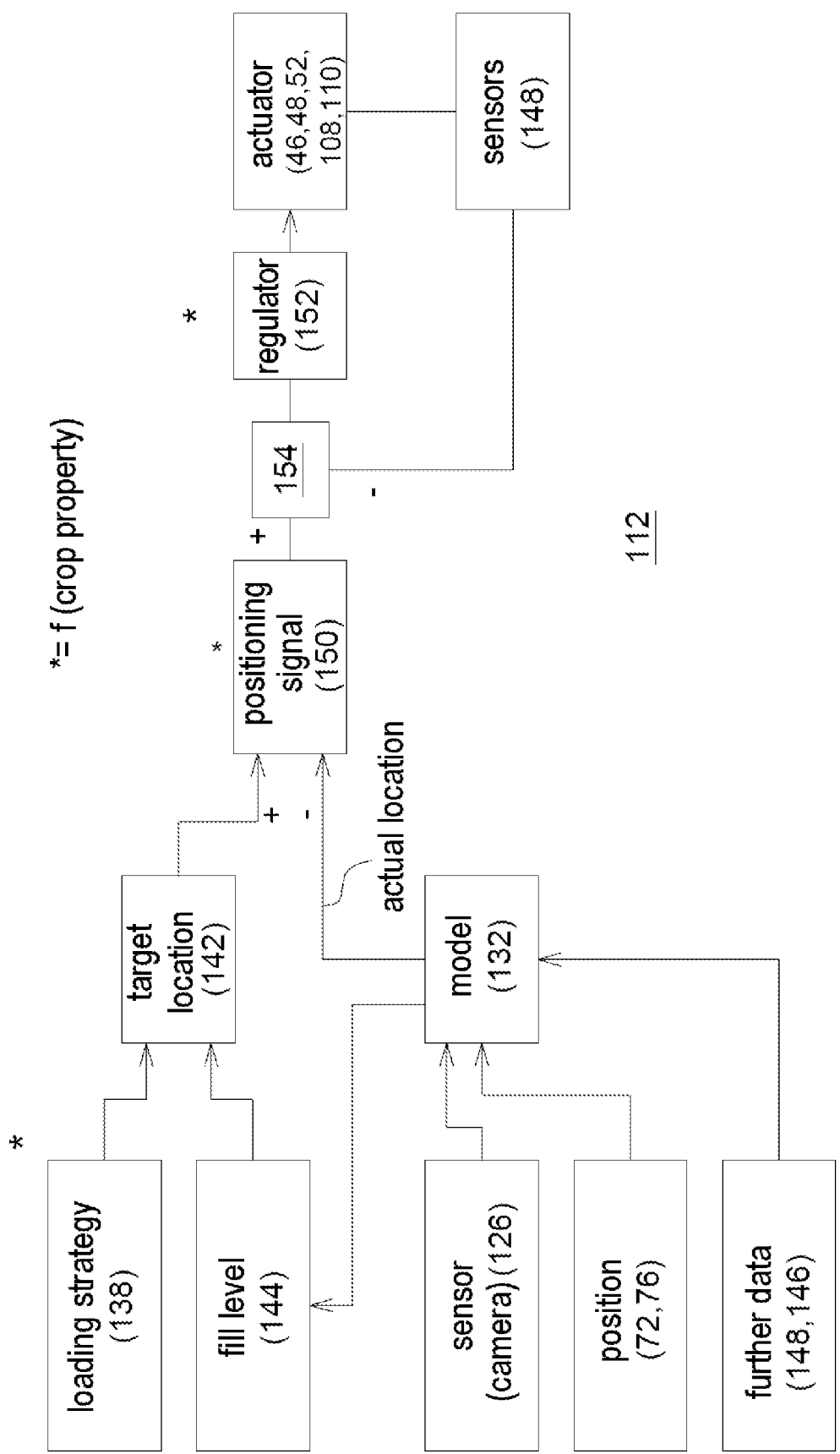
FIG. 5 is a diagram of the structure and the functionality of the electronic control unit for controlling the transfer process.

FIG. 5 shows a diagram of the design and the functionality of the electronic control unit 112 in the supervision of the transfer process.

It will first be described how a desired impact location 134 is calculated. For this purpose, data for different loading strategies 138 are stored or definable in the memory 122, which can be selected or input, for example, depending on the type and size of the cargo container 18 by the operator via an operator interface 140. An automatic identification of the cargo container 18 by means of the sensor system 126 it is also conceivable. In this respect, reference is made to the disclosure of DE 10 2008 002 006 A1. The loading strategy 138 defines, as already described above, at which impact locations 134 the harvested material is to be deposited on the cargo container 18 and in which sequence. A module 142 calculates the desired impact location on the basis of the selected or input or automatically calculated loading strategy and on the basis of a fill level at the respective impinged impact location 134, which is calculated by a module 144. This can take place in the above-described manner, i.e., in that harvested material is applied to each impact location of the loading strategy 138 a single time until a desired fill level is reached. However, other procedures are also conceivable, for example, with continuous variation of the impact location or repeated filling up to different filling heights. The impact locations 134 do not necessarily have to be located one precisely behind another on the cargo container, but can also be adjacent to one another.

Furthermore, it will now be described how the current impact location is calculated by means of a model 132. The model 132 uses the signals from the processing circuit 130, i.e., the image signals of the sensor system 126, in order to identify the position of the border of the cargo container 18 and the current impact point 134. Alternatively or additionally, the signals of the position determination units 72 and 76 can be used, on the basis of which the relative position between reference points of the harvesting machine 10 and the cargo container 18 can be ascertained. The flight behavior of the harvested material can be ascertained on the basis of the signals from sensors 148, which are assigned to the actuators 46, 48, 52, and on the basis of a wind sensor 146. Data on the harvested material with respect to the type and contents, in particular moisture, can also be detected using the content sensor 124 in the model 138 and the chop length can be incorporated (ascertainable on the basis of the rotational velocity of the feed rollers in the intake channel 30 and the rotational velocity of the cutterhead 36). Furthermore, the model 132 can transmit the fill level at the respective impinged point to the module 144. Further details with respect to the model 132 are disclosed in EP 3 949 714 A1 and the documents cited therein, the disclosures of which are incorporated by reference in the present documents. As discussed in EP 3 949 714 A1, the operator can make correction inputs via the operator interface 140 if the harvested material does not land at the desired impact location 134 and this is taken into consideration and stored by the model 132 in a self-learning manner.

The desired impact location and the current impact location are supplied by the module 142 and by the model 138 to a module 150 for generating positioning signals for the actuators 46, 48, 52 and possibly 108, 110. The module 150 calculates the manner in which both impact locations deviate from one another in the forward direction and lateral direction and, based thereon, ascertains the positioning signal in terms of minimizing the deviation between desired impact location and current impact location 134, possibly using tables or the like (cf. EP 1 344 445 A1). The module 150 can also be embodied as a multivariable controller, since the actuators 46, 48, and 52 at least partially mutually influence one another (see EP 1 454 520 A1). A positioning signal is only applied to the actuators 108, 110 if necessary, in particular if the movement range of the actuators 46, 48, and 52 comes into the vicinity of a stop (cf. EP 1 219 158 A1, EP 2 827 213 A2, and EP 2 510 775 A1).

The positioning signal is compared by a module 154 to a signal of the sensor 148 for detecting the current position of the actuator 46, 48, 52 and the difference is supplied to a regulator 152, which is embodied as a PID (proportional-integral-differential) computer and in turn controls the hydraulically or electrically operated actuators 46, 48, 52 via suitable valve units or driver circuits. In this case, a variable velocity of the actuators 46, 48, 52 is preferably possible, which is achievable in hydraulic controllers by proportional valves or pulse width-modulated valves in order to be able to variably activate the velocity of the actuators 46, 48, 52 depending on the positioning signal.

The regulator 152 can be viewed with the actuators 46, 48, 52, sensors 148, and the module 154 as an inner control loop, using which the impact point 134 is regulated so that it corresponds to the desired impact point predetermined by the loading strategy 138. The model 138 having the sensors for detecting the current impact point and the modules 142 and 150 form an outer control loop, which specifies the impact point 134 and adjusts it by way of the control signals to the inner control loop.

Since in practice it has been established that the behavior of both control loops, which is determined, inter alia, by the step width of the loading strategy 138 and the proportionality factor used by the regulator 152, which defines a ratio between input and output signal of the regulator 152, is not optimal for every harvested material, it is provided that one or more parameters of the control loops depend on properties of the harvested material. These properties are, for example, the type of the harvested material, its moisture and/or its chop length and/or the material throughput and/or the velocity of the transferred material. These variables have previously been incorporated in the prior art into the model 138 in order to estimate the flight properties of the harvested material (see EP 3 949 714 A1) or are used to define the variable of an edge zone to which the harvested material is not applied to avoid harvested material losses (EP 1 977 640 A1).

However, if one compares the behavior of grass or corn, for example, it is established that the corn has heavy particles, the jet of which does not fan out in flight and is not deflected by wind, while the lighter grass supplies a jet that fans out and is easily deflected. The corn is therefore quite noncritical and only requires fairly small adjustments of the actuators, while grass is more critical and would require faster adjustments of the actuators to achieve a suitable regulating behavior and avoid harvested material losses due to harvested material falling on the ground past the cargo container 18. In other words, the previous regulations parameterized independently of said properties of the harvested material are not optimal for all properties of the harvested material occurring in practice. It is therefore provided that the reaction to a given deviation between desired and current impact location is dependent on said harvested material properties. In the case of a harvested material having a small ratio of mass to surface area, a greater reaction of the positioning signal to a possible deviation between target value and actual value of the impact location is thus provided than in the case of a harvested material having a larger ratio of mass to surface area, i.e., the regulation operates more aggressively. Additionally or alternatively, the respective throughput and/or material velocity can be taken into consideration for this purpose, because it is apparent that with greater throughputs and material velocities through the discharge unit (discharge spout 40), the flight behavior is more stable than in the case of lower throughputs. It can also be taken into consideration here that the adjustment behavior of the discharge spout can change depending on the throughput and/or the material velocity because it will react more sluggishly in the case of greater throughputs and material velocities than in the case of lesser throughputs and material velocities. Depending on the overall effect of flight behavior and adjustment behavior, the reaction in the case of the greater throughputs and/or material velocities can be less than or greater than in the case of lower throughputs and/or material velocities. The material velocity can be ascertained on the basis of the speed of the fan 38 or by a suitable sensor (see DE 10 2018 004 219 A1), similarly, the throughput can be ascertained sensorially, for example, on the basis of the distance of two feed rollers arranged one over the other in the intake channel 30 or a detected load in a drivetrain of an element which conveys or processes the harvested material.

For this purpose, the proportionality factor of the regulator 152 can be changed accordingly, i.e., for corn can be less than for grass, for high moisture of the harvested material less than for low moisture, for short chop length greater than for longer chop length, and for large throughputs and/or material velocity less than or greater than for small throughputs. The type of the harvested material can be ascertained on the basis of the signals of the content sensor 124 by comparison to spectra of different types of harvested material or on the basis of information with respect to the harvested material header 28, the moisture can be ascertained on the basis of the content sensor 124 and the chop length can be ascertained as described above, i.e., on the basis of the rotational velocity of the feed rollers in the intake channel 30 and the rotational velocity of the cutterhead 36.

Additionally or alternatively, the maximum dimension of the positioning signal supplied to the actuators 46, 48, 52, and possibly 108, 110 can be limited, i.e., for corn can be less than for grass, for high moisture of the harvested material less than for low moisture, and for short chop length greater than for longer chop length. In this way, the adjustment movement takes place slower or faster. A proportional valve can be used in this case, for example, for activating a hydraulic cylinder or motor, which is opened more or less depending on the dimension of the positioning signal, or the pulse width by which a pulse-controlled hydraulic valve is opened, can be varied accordingly. An electric motor can analogously be operated with more or less voltage. The maximum dimension of the positioning signal accordingly influences the velocity at which the actuator carries out the positioning movement, but not (or only indirectly) the chronological duration of the positioning movement.

Additionally or alternatively, a hysteresis can be used in the activation of the actuators 46, 48, 52, and possibly 108, 110, which is greater for corn than for grass, is greater for high moisture of the harvested material than for low moisture, and is less for short chop length than for longer chop length. This hysteresis defines from which deviation between target value and actual value of the position of the actuator (this relates to the inner control loop) or the position of the impact location of the harvested material on the cargo container (this relates to the outer control loop) a reaction of the actuator is to take place.

The parameters described in the three preceding paragraphs relate to the inner control loop and/or alternatively or additionally thereto the outer control loop in the case of the preceding paragraph (with respect to the hysteresis, as stated above). In other words, the limiting of the positioning signal supplied to the actuators 46, 48, 52 and possibly 108, 110 and/or the consideration of the hysteresis can take place in the module 150 and/or by the regulator 152.

In the outer control loop, the loading strategy 138 can be adapted (alternatively or additionally thereto). For this purpose, smaller step widths can be provided in the loading strategy than with a harvested material having a greater ratio of mass to surface area. Accordingly, the step width can be greater for corn than for grass, can be greater for high moisture of the harvested material than for low moisture, and can be less for short chop length than for longer chop length. The cargo container could thus have the harvested material applied to it at n (n is a natural number) impact points 134 in the case of corn and at 2n impact points in the case of grass, wherein the impact points for corn lie between those for grass.

Finally, it is also to be noted that a possible relative movement between the cargo container 18 and the harvesting machine 10 can be taken into consideration in the described parameters of the inner control loop. The regulation can thus take place more aggressively with greater relative movement, for example, when traveling on curves, by the adaptation of the above-mentioned parameters of the inner control loop than with noncritical situations having absent or less relative movement. Harvested material losses are thus avoided in the critical situations, without having to accept unnecessarily hectic regulating behavior in noncritical situations.

The loading strategy can also be adapted for specific relative movements (for example cornering) in that the discharge spout 40 is moved as much as possible into a position which is accompanied by a minimal relative movement of the discharge spout during cornering, in order to keep the same impact point in the cargo container 18. If, for example, one fills the rear part of the cargo container 18 and travels into an inside curve (cargo container 18 in the inner, smaller radius), the discharge spout 40 is then pivoted all the way forward to minimize the relative movement which takes place due to the rotation of the harvesting machine 10 by reducing the lever arm.

Various features are set forth in the following claims.

What is claimed is:

1. A system for automatically controlling a transfer process, in which harvested material is transferred from a harvesting machine into a cargo container of a transport vehicle, the system comprising:
   an electronic control unit configured to receive one or more signals and generate one or more positioning signals for influencing a location of an impact point of the harvested material in the cargo container to carry out a predetermined loading strategy for filling the cargo container,
   wherein the control unit is configured to control a step width of the loading strategy for successive loading of the cargo container at different impact points and the positioning signal with a given deviation between at least one of an impact point of the harvested material predetermined by the loading strategy or an impact point of the harvested material ascertained based on the signals as a function of information supplied to the control unit with respect to at least one property of the harvested material.

2. The system as claimed in claim 1, wherein the one or more actuators influence one or more of the following parameters: a relative position between the harvesting machine and the loading container in a forward direction and/or a lateral direction, an angle of a discharge unit of the harvesting machine around a vertical axis, an angle of the discharge unit of the harvesting machine around a horizontal axis, or an angle of an end-side discharge flap of the discharge unit of the harvesting machine in relation to the discharge unit.

3. The system as claimed in claim 1, wherein the information supplied to the control unit with respect to the property of the harvested material relates to one or more of: a type of the harvested material, a moisture of the harvested material, a particle size of the harvested material, an amount of the harvested material transferred per unit of time, or a velocity of the harvested material.

4. The system as claimed in claim 2, wherein the information supplied to the control unit with respect to the property of the harvested material relates to one or more of: a type of the harvested material, a moisture of the harvested material, a particle size of the harvested material, an amount of the harvested material transferred per unit of time, or a velocity of the harvested material.

5. The system as claimed in claim 1, wherein the control unit includes an inner control loop for activating the actuator, which is configured to generate at least a part of the positioning signal delivered to the actuator proportionally to the deviation between the impact point of the harvested material predetermined by the loading strategy and the impact point of the harvested material ascertained on the basis of the signals, and wherein the control unit is configured to specify an associated proportionality factor of the inner control loop as a function of the information with respect to the property of the harvested material.

6. The system as claimed in claim 2, wherein the control unit includes an inner control loop for activating the actuator, which is configured to generate at least a part of the positioning signal delivered to the actuator proportionally to the deviation between the impact point of the harvested material predetermined by the loading strategy and the impact point of the harvested material ascertained on the basis of the signals, and wherein the control unit is configured to specify an associated proportionality factor of the inner control loop as a function of the information with respect to the property of the harvested material.

7. The system as claimed in claim 3, wherein the control unit includes an inner control loop for activating the actuator, which is configured to generate at least a part of the positioning signal delivered to the actuator proportionally to the deviation between the impact point of the harvested material predetermined by the loading strategy and the impact point of the harvested material ascertained on the basis of the signals, and wherein the control unit is configured to specify an associated proportionality factor of the inner control loop as a function of the information with respect to the property of the harvested material.

8. The system as claimed in claim 1, wherein the control unit is configured to limit the positioning signal to a maximum value dependent on the information with respect to the property of the harvested material and/or to use a hysteresis dependent on the information.

9. The system as claimed in claim 2, wherein the control unit is configured to limit the positioning signal to a maximum value dependent on the information with respect to the property of the harvested material and/or to use a hysteresis dependent on the information.

10. The system as claimed in claim 3, wherein the control unit is configured to limit the positioning signal to a maximum value dependent on the information with respect to the property of the harvested material and/or to use a hysteresis dependent on the information.

11. The system as claimed in claim 5, wherein the control unit is configured to limit the positioning signal to a maximum value dependent on the information with respect to the property of the harvested material and/or to use a hysteresis dependent on the information.

12. The system as claimed in claim 5, wherein the control unit comprises an outer control loop for ascertaining the deviation between the impact point of the harvested material predetermined by the loading strategy and the impact point of the harvested material ascertained on the basis of the signals, which is used jointly with a sensorially detected value for a current position of the actuator as an input signal for the inner control loop.

13. The system as claimed in claim 8, wherein the control unit comprises an outer control loop for ascertaining the deviation between the impact point of the harvested material predetermined by the loading strategy and the impact point of the harvested material ascertained on the basis of the signals, which is used jointly with a sensorially detected value for the current position of the actuator as an input signal for the inner control loop.

14. The system as claimed in claim 12, wherein the control unit is configured to determine the impact point on the basis of sensorially detected values and a model, using the values, for a flight behavior of the harvested material.

15. The system as claimed in claim 1, wherein the control unit is configured, for a harvested material having a small ratio of mass to surface area, to output a greater reaction of the positioning signal to a possible deviation between target value and actual value of the impact point and/or a smaller step width in the loading strategy than for a harvested material having a larger ratio of mass to surface area.

16. The system as claimed in claim 2, wherein the control unit is configured, for a harvested material having a small ratio of mass to surface area, to output a greater reaction of the positioning signal to a possible deviation between target value and actual value of the impact point and/or a smaller step width in the loading strategy than for a harvested material having a larger ratio of mass to surface area.

17. The system as claimed in claim 1, wherein the control unit is configured to take into consideration a relative movement between the harvesting machine and the transport vehicle in the generation of the positioning signal.

18. The system as claimed in claim 2, wherein the control unit is configured to take into consideration a relative movement between the harvesting machine and the transport vehicle in the generation of the positioning signal.

19. A harvesting machine comprising the system as claimed in claim 1.

20. A harvesting machine comprising the system as claimed in claim 2.

* * * * *